United States Patent [19]
Hemingway

[11] Patent Number: 5,448,688
[45] Date of Patent: Sep. 5, 1995

[54] IMAGE POSITION INTERPRETATION IN A GRAPHICS SYSTEM

[75] Inventor: Peter Hemingway, Bristol, England

[73] Assignee: Hewlett-Packard Company, Palo Alto, Calif.

[21] Appl. No.: 211,496

[22] PCT Filed: Oct. 10, 1991

[86] PCT No.: PCT/GB91/01766
§ 371 Date: Apr. 7, 1994
§ 102(e) Date: Apr. 7, 1994

[87] PCT Pub. No.: WO93/07560
PCT Pub. Date: Apr. 15, 1993

[51] Int. Cl.$^6$ ............................................. G06T 11/00
[52] U.S. Cl. ...................... 395/141; 395/143; 395/133; 395/134; 395/135
[58] Field of Search ................ 395/118–122, 395/129, 131, 133, 135, 141, 143, 155, 161, 134

[56] References Cited

U.S. PATENT DOCUMENTS

| | | | |
|---|---|---|---|
| 4,870,599 | 9/1989 | Hempel et al. | 395/131 |
| 4,982,345 | 1/1991 | Callahan et al. | 395/155 |
| 5,208,909 | 5/1993 | Corona et al. | 395/155 |

FOREIGN PATENT DOCUMENTS

| | | | |
|---|---|---|---|
| 2186470 | 8/1987 | United Kingdom | G09G 1/14 |
| 0316144 | 5/1989 | United Kingdom | G06F 15/40 |

OTHER PUBLICATIONS

Eurographics '88, Proceedings Of The European Computer Graphics Conference And Exhibition Editor(s), 12 Sep. 1988, Nice, France, pp. 381–392; M. Slater and A. Davison et al, "Liberation from Rectangles: A Tiling Method for Dynamic Modification of Objects on Raster Displays".

Computer Display Architecture, Peter Hemingway, Aug. 1987 Principles Of Interactive Computer Graphics, William Newman et al., 2nd Edition, 1981.

*Primary Examiner*—Almis R. Jankus

[57] ABSTRACT

In inter-active computer graphics systems a pointing device, such as a mouse, is generally used to move a cursor over a displayed image to point to a particular image element. An action may then be initiated by clicking a mouse button. In order for an application (110) using the graphics system (11, 100) to understand what action is required, the graphics system must translate the image position pointed to by the mouse into the identity of the corresponding image element. To facilitate this translation, the present graphics system (11,100) in generating the output image from a stored group of graphic segments (20), also generates and stores a compact image representation (60) relating image position to the corresponding segment. This image representation (60) is then subsequently used to translate an input image position back into a segment identity. Furthermore, the input image position is also subject to the reverse of the spatial transformation undergone by the segment during generation of the output image whereby to determine the position in the segment corresponding to the input image position.

12 Claims, 9 Drawing Sheets

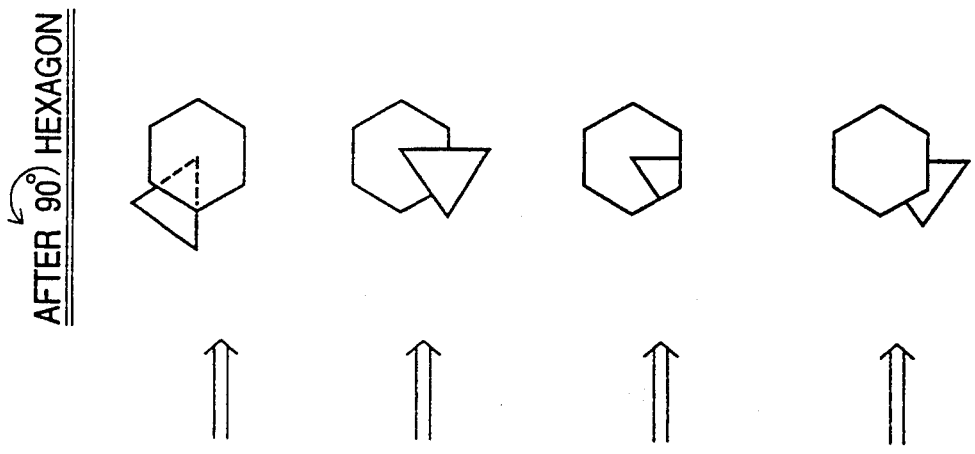
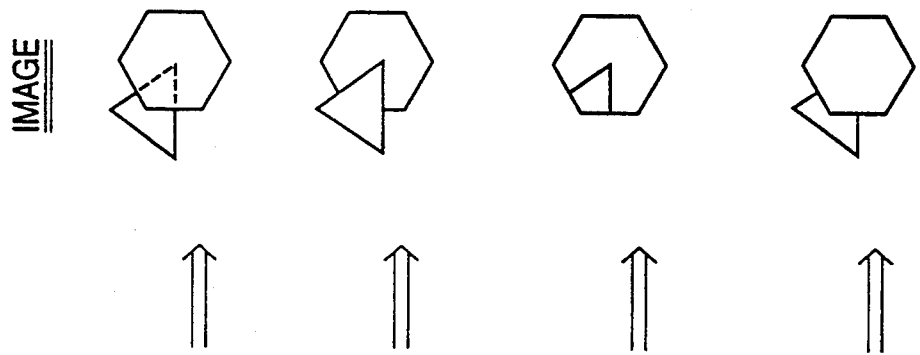
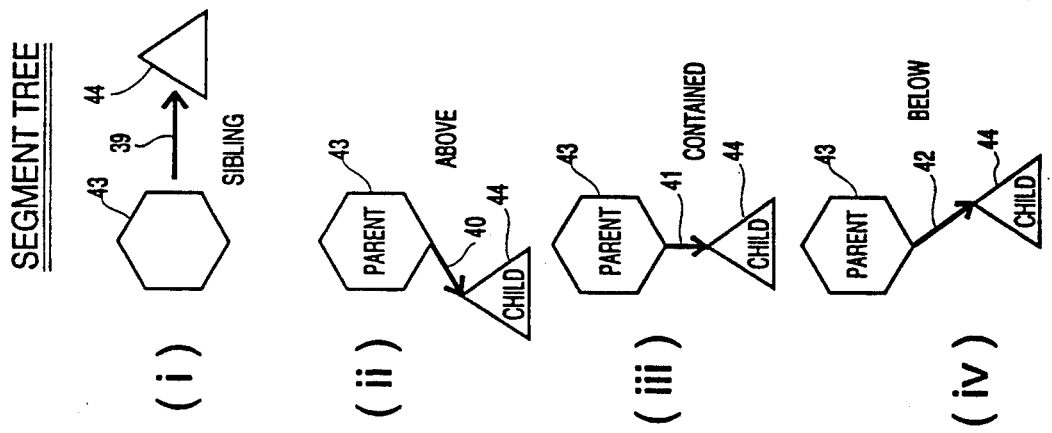
FIG 3

FIG 11(i)
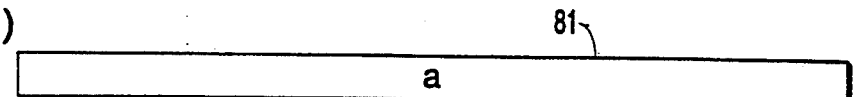
FIG 11(ii)
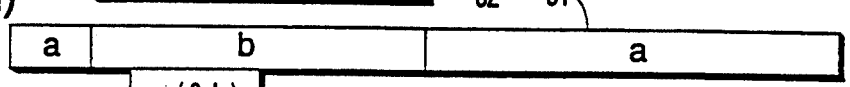
FIG 11(iii)
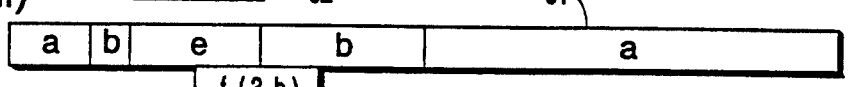
FIG 11(iv)
FIG 11(v)
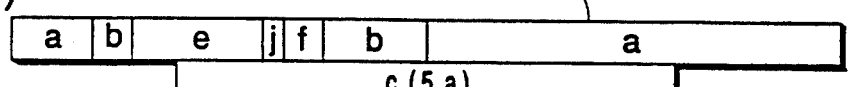
FIG 11(vi)
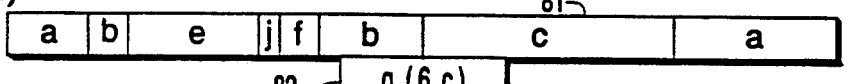
FIG 11(vii)
FIG 11(viii)
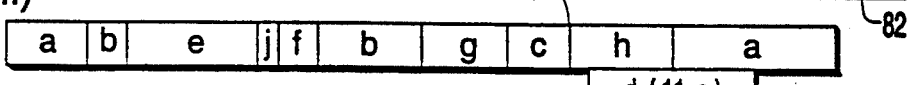
FIG 11(ix)
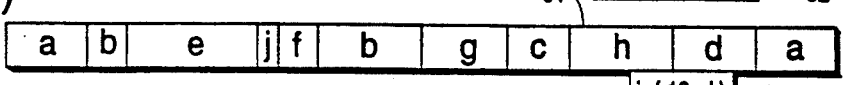
FIG 11(x)
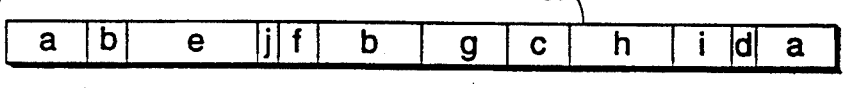

IMAGE POSITION INTERPRETATION IN A GRAPHICS SYSTEM

TECHNICAL FIELD

The present invention relates to the interpretation of an image position input into a graphics system in image coordinate terms.

BACKGROUND ART

Inter-active computer graphics systems are known in which a pointing device, such as a mouse, is used to move a cursor over a displayed image to point to a particular image element. The user can generally select and operate on the element pointed to by the cursor by pressing a button associated with the pointing device. In order for the underlying application program to understand what the user is intending, the graphics system must be able to associate the image position currently pointed to by the pointing device with a graphic object (or segment) known to the application. This translation of image position into graphic segment identity is central to the operation of inter-active graphic systems and is sometimes referred to as 'hit detection'.

Hit detection is complicated by the fact that generally the underlying application and the graphics system utilises a common internal representation of the image to be displayed, which representation is made up of a plurality of discrete graphic segments that potentially overlap in the image. This representation does not map directly onto the output image and must be converted by the graphics system into a form suitable for display; this conversion process involves the resolution of overlap conflicts between graphic segments. The internal representation of the image in terms of graphic segments therefore cannot be used directly to interpret a received image position.

Accordingly, known hit detection techniques often involve re-running the conversion process until an output image element is generated that matches the received image position. Such a technique is described, for example, on page 200 of "Principles of Interactive Computer Graphics" William M. Newman and Robert F Sproull, second edition, McGraw-Hill, a standard textbook on computer graphics.

Another possible hit detection technique would be to use a frame buffer for storing each image pixel together with the identity of the associated graphic segment. Such an arrangement does, however, require the use of a substantial amount of memory.

In any event, in many cases it would be desirable for the underlying application to know not only the identity of the graphic segment pointed to by a pointing device, but also the corresponding point on that segment. In this respect it should be noted that the graphic segment will generally have undergone a spatial transformation involving translation, rotation and scaling in being convened from its internal representation understood by the application, to its form appearing in the image and pointed to by the pointing device. Ideally, the determination of the segment position pointed to, should be transparent to the underlying application.

It is an object of the present invention to provide a graphics systems capable of translating a received image position into the identity of the corresponding graphic segment, and a position on that segment, without involving the underlying application.

SUMMARY OF THE INVENTION

According to the present invention, there is provided a graphics system including segment storage means for storing a plurality of graphic segments that are intended for display, potentially in overlapping relation, in a two-dimensional output image, said graphic segments having associated spatial transformation data for transforming the segments from segment coordinates into image coordinates, converter means for deriving from the stored graphic segments, output signals representative of said two-dimensional image with all overlap conflicts between segments resolved, the converter means being operative to locate each segment in said image in dependence on said spatial transformation data, and input-event processing means for receiving an image position in image coordinate terms and determining the corresponding segment location; said converter means, in generating said output signals, being operative to generate and store an image representation relating image positions to segment identity, and said input-event processing means being operative to determine the identity of the segment corresponding to the image position received thereby, by reference to said representation and to map the received image position into segment coordinates by use of said spatial transformation data.

This arrangement ensures that the translation of the received image position into segment identity and position are effected in a manner transparent to any underlying application serviced by the graphics system. The graphics system thus maps input-device resolution dependent input events into resolution independent form.

Preferably, the graphic segments are stored in said segment storage means as a hierarchical organisation of graphic segments with each segment having an associated relative spatial transform, said transforms jointly constituting said spatial transformation data. In this case the converter means is operative to locate each child segment in said image in dependence on a concatenation of the relative transforms associated both with that segment and with its ancestors in said organisation; and said input-event processing means is operative in mapping said received image position into segment coordinates to effect a reverse transformation to that carried out by the converter means for the segment corresponding to the received image position.

Advantageously, the concatenation of relative transforms used by the converter means in locating a said child segment in said image, is stored with the corresponding segment, the input-event processing means being operative to access this concatenation when effecting a reverse transformation.

The image representation generated by the converter means preferably takes the form of a set of spans for each of a plurality of lines used to build up the image, each span representing at least a portion of a respective segment to be displayed in said image and including delimiting coordinate values along the corresponding image line and data indicative of the segment concerned.

In most situations, the input-event processing means will be arranged to receive a succession of image positions (for example as a pointing device is moved over a substantial distance). In order to avoid unnecessary processing activity, the graphics system is preferably arranged to translate image position into segment position only when the latter is likely to be of interest to an underlying application. Accordingly, the input-event processing means may be arranged to detect when the segment corresponding to the current received image position differs from that corresponding to the preceding received image position, and thereupon to map the current received image position into segment coordinates. Alternatively, or additionally, the input-event processing means may be arranged to await an external trigger event (such as operation of a mouse button) before mapping the most recently received image position into segment coordinates. Both the foregoing options require that the input-event processing means be provided with a memory.

Frequently, the graphics system will be operated using a pointing device from which said received image position is derived; in this case, the aforesaid plurality of graphic segments will generally include a cursor segment for indicating the location of said received image position in the output image. Advantageously, said converter means is operative to generate and store an image representation of said cursor segment that is distinct from the main image representation, the converter means being operative to combine these image representations in generating said output signals with the cursor image representation taking precedence over the main image representation.

Preferably, the cursor image representation includes associated offsets that serve to determine the placement of the cursor image representation within the main image representation when the two representations are combined, the input-event processing means being operative to update said offsets in response to the receipt of image positions relating to the cursor segment.

The input-event processing means can be arranged to receive and independently process image position information from a plurality of different input devices.

Advantageously, in order to permit overlapping trigger zones in the output image, the said plurality of segments includes transparent segments not intended to be viewable in the output image. In this case, the converter means is arranged to incorporate the transparent segments in the aforesaid image representation where they would appear if not transparent but without removing segment portions they overlap; in addition, the converter means is arranged to disregard said transparent segments when generating said output signals. One image position may therefore correspond to several segments in the image representation, one of these segments being opaque and viewable in the output image whilst the others are transparent and not displayed. The input-event processing means in determining the identity of the segment corresponding to said received image position, is now arranged also to identify any transparent segments at the same image position.

BRIEF DESCRIPTION OF THE DRAWINGS

A graphics system embodying the present invention, will now be described, by way of non-limiting example, with reference to the accompanying diagrammatic drawings, in which:

FIG. 3 is a diagram showing the nature of the various inter-segment relationships illustrated in FIG. 2 in terms of the resultant two-dimensional image formed from the segments concerned;

FIG. 11 is a diagram illustrating the build up of one span list of the span table for the example segment tree and image of FIGS. 4 and 5.

BEST MODE OF CARRYING OUT THE INVENTION

Figure 1:
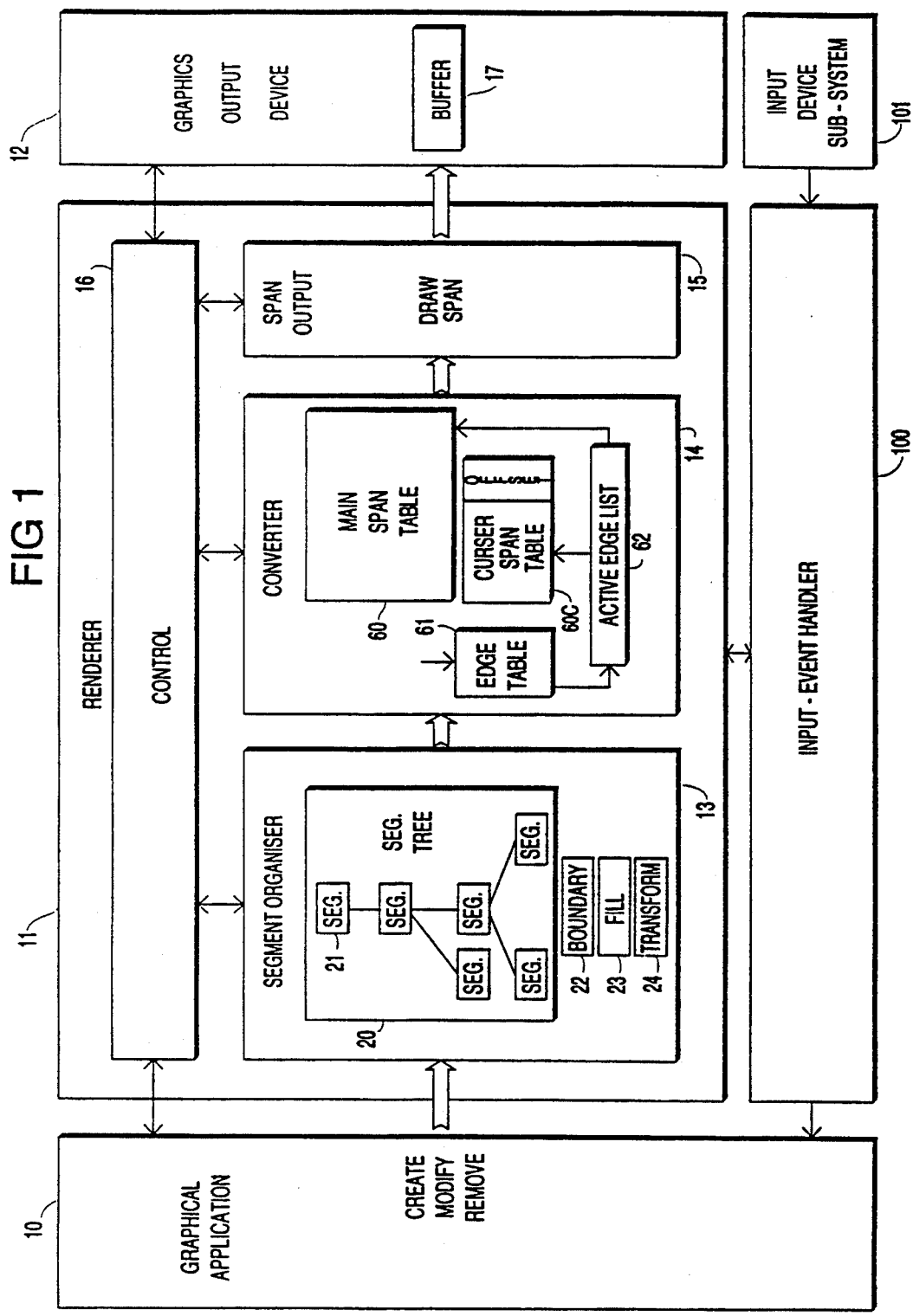
FIG. 1 is a functional block diagram of the graphics system showing a renderer that serves both to organise graphic segments to be presented as a two-dimensional image, and to convert these segments into a series of spans held in a span table for output to a graphics output device.

The graphics system shown in functional block diagram form in FIG. 1 comprises a renderer 11 operative to interface a graphical application 10 to a graphics output device 12 such as a visual display unit, and an input-event handler 100 for processing input events generated by graphical input devices 101 and appropriately informing the application 10 of such events.

The Renderer

The graphical application 10 instructs the renderer 11 to build up an output image, this instruction being in the form of commands to create, modify or remove graphic segments 21. These graphics segments, which are the only graphic elements used to construct the output image, are created and stored in a segment organizer 13 of the renderer 11. The organizer 13 organises the segments 21 into a segment tree 20 which, as will be more fully described hereinafter, determines the interrelationship of the segments in the final image. The graphic segments 21 are such that they potentially overlap each other in the final image so that depth priority resolution is necessary.

Each graphic segment 21 is defined in terms of its boundary, fill and transform. These parameters are described more fully below and for the present it is sufficient to note that the parameters of boundary, fill and transform will generally be stored by the organizer 13 in respective data structures 22, 23 and 24 which are referenced by the segments 21 as required.

Once the graphical application 10 has finished instructing the renderer 11 to build up the desired output image in terms of the segment tree 20, this segment tree is converted by a converter 14 of the renderer 11 into a form suitable for output to the graphics output device 12. More particularly, the segment tree is converted into a span table 60 in which the image is represented as a succession of lines made up of one or more spans. As will be described hereinafter, in constructing the span table 60 the converter 14 first forms an edge table data structure 61 and then builds up each line of the output image using an active edge list data structure 62. The conversion process resolves any overlap conflicts between the segments in terms of their inter-relationships and depth priorities.

The image information contained in the span table 60 is then output to the graphics output device 12 by a span output process 15. This process may either output span information line by line as each line is completed or else wait until the span table is finished and then pass the span information to the device 12. The actual passing of span information is effected a single primitive "Drawspan" that simply instructs the output device 12 to draw a span of specified length.

The graphics output device 12 will generally buffer information received from the renderer 11 in a buffer 17 before displaying/printing the final output image. In many cases, the buffer 17 will be a frame buffer holding a full image representation.

The overall operation of the renderer 11 is controlled by a control unit 16, the primary function of which is to sequence the operation of the various elements. In particular, the control unit 16 ensures that the converter 14 does not start its conversion process until the graphical application 10 has finished instructing the segment organizer 13 regarding the construction of the segment tree 20. Furthermore, the control unit 16 ensures that the span output process 15 is coordinated with the build up of the span table 60. It will be appreciated that although the control unit 16 has been shown as a distinct functional entity, in practice its functionality may well be embedded within the other functional elements; thus, for example, the segment organizer 13 may implement an interlock arrangement to ensure that the graphical application 10 and the converter 14 cannot simultaneously access the segment tree 20.

From the foregoing overview of the renderer 11, it can be seen that it provides a conceptually simple interface between the graphical application 10 and the graphics output device 12 since, on the one hand, its interface with the graphical application 10 is defined in terms of a single graphics element (namely the graphics segment 21) whilst, on the other hand, its interface with the graphics output device 12 is defined in terms of a single operational primitive (Drawspan). This latter feature ensures that the renderer 11 can be ported between the different output devices without difficulty.

Segments & Segment Organizer

The attributes and possible inter-relationships of a graphic segment 21 will now be described with reference to the segment 21 A in FIG. 2 (it should be noted that in the present description the term "graphic segment" is applied to all representations of a segment—in the case of FIG. 2, the segment 21A is represented in terms of a data structure including fields 28 to 38 that define the parameters or attributes of the segment).

The first field associated with the segment 21A is a segment identity field 28 uniquely identifying the segment. The remaining defining fields are divided into two groups, namely a first group of fields 29 to 32 that are directly concerned with how this segment appears in the final image, and a second group of fields 34 to 38 that define the inter-relationship of the segment 21A with other segments in the segment tree 20 (these inter-relationships do, of course, also affect how the segment is displayed in the final image but this effect is less personal than that of the fields 29 to 32).

Field 29 defines the boundary of the segment in terms of one or more outlines specified by their defining points (i.e. vertices) where a point is an X-Y co-ordinate pair in an X,Y co-ordinate space in which the basic unit of distance in each co-ordinate direction is a "point-unit" (this is a conceptual unit that is used between the graphical application 10 and the renderer 11 and which is translated into real-world image dimensions in a manner to be described hereinafter). In fact, the segment data structure will generally not contain the full specification of the boundary but merely hold in field 29 a pointer to a boundary data structure 22 that contains the set or sets of defining points; this arrangement enables segments to share a common boundary definition. The segment boundary is considered to have zero width.

Within its boundary, a segment contains a "fill" that can be of one of three forms, namely a solid colour, a half-tone, or a bit map. In the case of a solid colour fill, the relevant colour specification will be held directly in a fill field 30; for other types of fill, the field 30 will hold a pointer to a fill data structure 23 that specifies the nature of the desired fill.

The boundary and fill fields 29, 30 define the basic form and content of the segment 21A. Its position relative to a parent segment is then defined by a Relative Transformation Matrix (RTM) specified in a field 31; again, this specification will generally be in terms of a pointer held in the field 31 and pointing to a transform data structure 24.

The Relative Transformation Matrix (RTM) is a three by three matrix of the form:

Sx Ry 0
Rx Sy 0
Tx Ty 1

The RTM is used to transform a point (and Boundaries because they are composed entirely of points) in one co-ordinate space to the corresponding point defined by the matrix; Sx and Sy apply scaling of the X and Y components. Tx and Ty provide translations for the X and Y components of a point. Rx and Ry are X and Y shear values which, in combination with Sx and Sy are used to provide rotation. The last column of the matrix is provided to allow concatenation of several three by three matrices into a single matrix by simple matrix multiplication.

Field 32 is a transparency field used to flag segments which although not visible in the final image are considered present for the purposes of user input via the displayed image.

The second group of fields 34 to 38 of the segment 21A define the relationship of the segment 21A with other segments by means of pointers to these other segments. Thus, the field 34 contains a pointer to a segment 21P that constitutes a parent segment for the segment 21A. The field 35 contains a pointer to a sibling segment 21S(1) of the segment 21A (that is, a segment which has both the same parent 21P as the segment 21A). The sibling relationship of the segments 21A and 21S(1) is indicated in FIG. 2 by the arrow 39. The sibling segment 21S(1) may likewise contain a sibling pointer to a further sibling 21S(2). Similarly, the segment 21A may itself be pointed to by another sibling (not shown). In this manner, a sibling chain is established for siblings having the same parent segment 21P. In fact, as will become clear below, separate sibling chains exist for siblings which, while having the same parent, have different relationships with that parent. The ordering of the siblings in a sibling chain determines the relative depth priorities of the siblings.

The segment 21A also contains three pointers in fields 36, 37, and 38, to child segments 21C, each pointer pointing to a different type of child segment. Thus, the field 36 points to child segments 21C that are in an "above attachment" relationship with the segment 21A, this relationship being indicated by arrow 40 in FIG. 2. In fact, the pointer contained in field 36 points to the first child in a sibling chain 25 of all segments 21C associated with the segment 21A by an above-attachment relationship. Similarly, the pointer held in field 37 points to the first child segment 21C in a sibling chain 26 containing all child segments associated with the segment 21A by a "containment" relationship 41. Again, the pointer held in the field 38 points to the first child segment 21C of a below sibling chain 27 of child segments that are associated with the segment 21A by a "below-attachment" relationship 42. The nature of the above-attachment, containment, and below-attachment relationships will be described hereinafter. From the foregoing, it can be seen that the segment 21A has one parent segment; none, one or more sibling segments; and none, one or more children segments arranged in three chains 25, 26 and 27.

Figure 2:
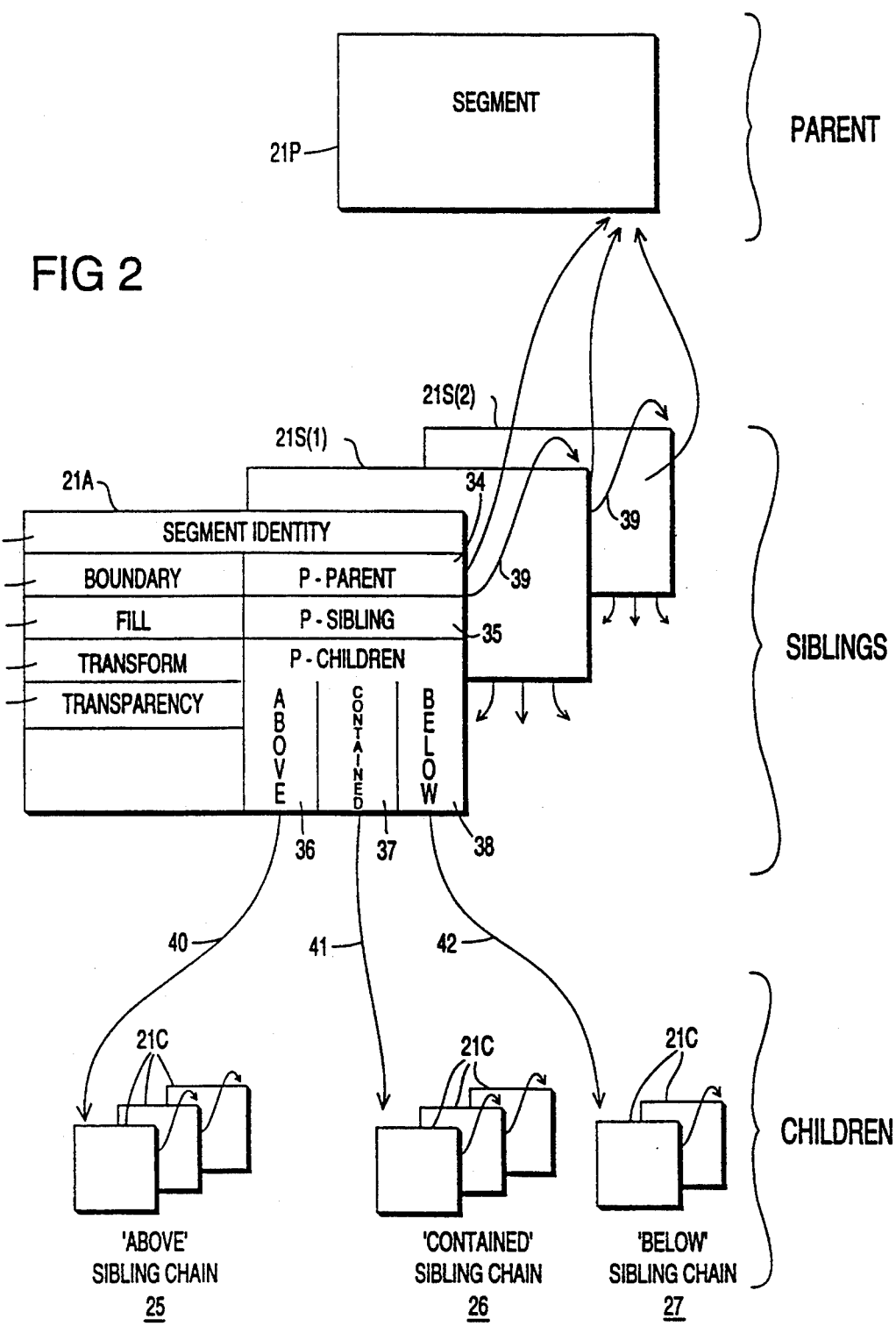
FIG. 2 is a diagram illustrating the data fields associated with a graphic segment and the possible inter-relationships of that segment with other segments.

It will be appreciated that in FIG. 2 only the segment 21A has had its full set of outward relationships described, the other segments illustrated in FIG. 2 having only some of their inter-relationships indicated.

By appropriate setting of the parent, sibling and child pointers held in the fields 34 to 38, it is possible to inter-relate a group of segments into an acyclic tree organisation constituting the segment tree 20. The relationships between the segments in the tree serve to fully specify how the various segments affect each other in the final image.

The nature of the "sibling", "contained", "above-attachment" and "below-attachment" relationships will now be described with reference to FIG. 3. In this Figure, a hexagon-shaped segment 43 and a triangular-shaped segment 44 are shown inter-related by each of the foregoing relationships. More particularly, the sibling relationship 39 is depicted in row (i), the above-attachment relationship 40 is shown in row (ii), the containment relationship 41 is shown in row (iii) and the below-containment relationship 42 is shown in row (iv). On the left hand side of each row the segment tree representation of the relationship is depicted. In the middle of each row the appearance of the segments in the output image is shown (for a given transformation of the segment 44 relative to the segment 43). On the right hand side of each row the appearance of the segments in the final image is shown after the hexagon-shaped 43 has been subject to an anti-clockwise rotation through 90°.

It can be seen from row (i) that when a segment 44 is in a sibling relationship to another segment 43, the segment further down the sibling chain has a lower depth priority and so is displayed behind the sibling higher up the sibling chain (in other words, the triangular segment 44 is displayed behind the hexagon segment 43 where these two segments overlap). Row (i) also shows the relative independence of the segments 43, 44 in that the segment 43 can be subject to spatial transformations without affecting the segment 44 (the converse is also true, although not illustrated in FIG. 3).

Row (ii) shows that where the triangular segment 44 is related to the parent segment by an above-attachment relationship, the segment 44 has a higher depth priority than the segment 43 and so appears above the latter where the two segments overlap. Furthermore, the segment 44 is not restricted to the boundary of its parent segment 43. However, the segment 44 is a true child segment of the parent 43 in that it is subject to spatial transformations experienced by its parent 43; thus when the hexagon segment is rotated through 90°, the child segment 44 is similarly rotated and maintains its position relative to the parent segment 43.

The containment relationship illustrated in row (iii) has similarities to the above-attachment relationship in that the child segment 44 overwrites its parent 43 where the two segments overlap. However, this time the child segment 44 is clipped to the boundary of its parent 43 (that is, it does not extend beyond the boundary of its parent). As with all children, the contained child segment 44 is subject to spatial transformations experienced by its parent 43, so that rotation of the latter through 90° also causes the segment 44 to be rotated to maintain its position relative to its parent segment 43.

Row (iv) shows that where a child segment 44 is in a below-attachment relationship to its parent 43, the parent has a higher depth priority where the two segments overlap and will therefore be displayed above the latter in the final output image. As with the above-attachment relationship, for the below-attachment relationship the child segment 44 is not restricted by the boundary of its parent 43 and can extend beyond the latter boundary. This is in contrast to the containment relationship where the child is, of course, clipped to the boundary of its parent. The below-attachment relationship like the other parent-child relationships results in the child segment 44 being subject to spatial transformations experienced by its parent so that, for example, rotation of the parent segment 43 through 90° results in the child segment being similarly rotated and maintaining its position relative to its parent.

A child segment, as well as having the above-described direct relationship with its parent, also inherits the following from its parent:

(a) spatial transformation inherited by the parent from its parent whereby the final image position, orientation and size of a segment are determined by the combination of all the spatial transformations of its ancestors together with the spatial transformation of the segment relative to its parent, (in terms of the RTMs of the segments, the overall transformation of a segment is a concatenation of the Relative Transformation Matrices all its ancestors together with its own RTM to give a cumulative transformation matrix herein referred to as the Concatenation Transformation Matrix or CTM);

(b) depth priority and clipping restrictions to which its parent is subject, this being of particular relevance to any child related to its parent by an above or below attachment relationship since it determines clipping and overwriting of the child beyond the boundary of its parent.

The latter inheritance gives rise to the concept that each child segment has a "background" segment which the child can overwrite but which also clips the child segment to lie within the boundary of the background segment. Where a child segment is associated with its parent by a containment relationship, then the parent also constitutes the background segment for the child. However, where the child is associated with its parent by an above or below attachment relationship, then the background segment for the child is not its parent but the first ancestor segment reached through a containment relationship when ascending the segment tree from the child segment concerned; in fact, this latter identification of a child's background segment is generally true, since where the child is related to its parent by a containment relationship, then the first ancestor segment reached from the child across a containment relationship will, of course, be the child's parent.

Figure 4:
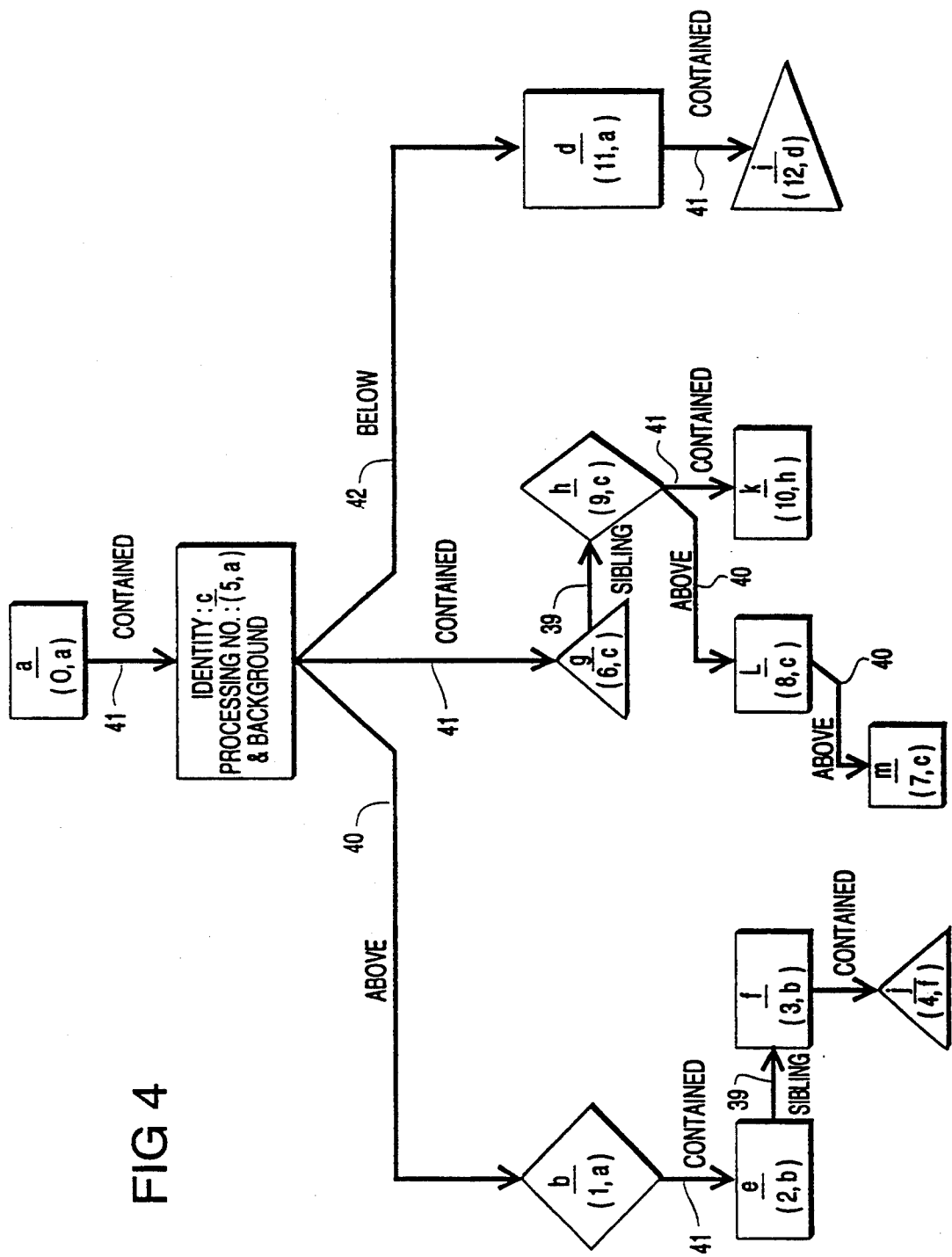
FIG. 4 shows one example of a segment tree formed by the renderer of FIG. 1.
Figure 5:
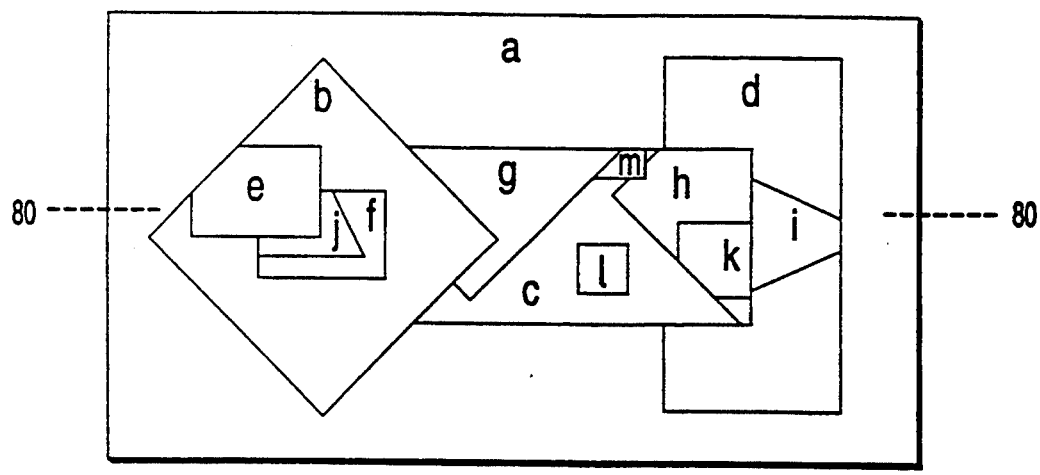
FIG. 5 shows the two-dimensional image corresponding to the example segment tree of FIG. 4.

FIGS. 4 and 5 show an example of a segment tree and the corresponding output image. In the segment tree of FIG. 4, the segments have been presented by their outlines and have been signed identification letters "a" to "m", these identifying letters being shown underlined within the segment boundaries. Also within each segment boundary is a (number, letter) pair shown in brackets; the letter of this pair identifies the background segment of the segment concerned whilst the number in the (number, letter) pair is a processing order number the purpose of which will be described below.

Segment "a" of the FIG. 4 segment tree is the root segment of the tree and, as such, is of particular significance. The scaling factors contained in the Relative Transformation Matrix of the root segment effectively define the scaling between the internal point-unit dimensions used by the renderer 11 and the dimensions of the output image displayed by the graphics output device 12 (frequently expressed in terms of pixels). In addition, the size of the root segment as defined by its boundary will generally be set to completely occupy the potential output image area made available by the output device 12 (after appropriate scaling as defined in the root's RTM). Generally, all other segments of the segment tree will be directly or indirectly associated with the root segment through a containment relationship 41 so that they will be clipped to lie within the boundary of the root segment. The only segments that are normally attached to the root segment by an above-attachment relationship are segments which are subject to rapid movement across the output image (for example, cursors in inter-active applications). Since the root segment generally completely occupies the output image, the below-attachment relationship is not used directly from the root segment.

FIG. 5 shows the root segment "a" as a rectangle bounding the limits of the output image with all other segments contained within the root segment.

Segment "c" is in fact the only segment in a direct containment relationship with the root segment. As can be seen, the segment "c" has three groups of children, namely an above-group that can appear above segment "c" (segments b,e,f,j), a contained group of segments that are clipped to the boundary of, but can overwrite, segment "c" (segments g,h,l,m,k) and a group of below segments that appear below segment "c" (segments d and i). Movement of segment "c" within the root segment "a" (by modification of the RTM of segment "c") results in all its child segments being similarly moved.

The construction of the output image of FIG. 5 from the segment tree of FIG. 4 should be apparent having regard to the foregoing description concerning the nature of the possible relationships between segments.

Accordingly, a detailed description of FIGS. 4 and 5 will not be given herein. However, a number of significant features are noted below.

The relative depth priorities of siblings is illustrated in FIGS. 4 and 5 by the segments "e" and "f". As can be seen, the segment "f" is a sibling of segment "e" but has a lower depth priority since it appears further down the sibling chain for contained child segments of parent segment "b". Accordingly, where segments "e" and "f" overlap, segment "e" is displayed in the output image. Segment "e" also overlaps the contained child of segment "f", this child being segment "j" (segment "e" would also overlap any above or below children of segment "f").

Segment "l" shows a segment related to its parent by an above-attachment relationship and illustrates the fact that such a segment, although taking priority over its parent should they overlap, does not in fact have to overlap its parent; whether or not an overlap occurs depends on the Relative Transformation Matrix of the child segment "l".

Segment "m" is a segment which is in an above-attachment relationship to segment "l" which as already noted is also in an above-attachment relationship to segment "h". Both these segments are written on segment "c" which constitutes the background segment for segment "l" and "m". As can be seen in respect of segment "m", a segment is clipped by its background segment even when the latter is not in a direct containment relationship.

Returning now to consideration of FIG. 1, the segment organizer 13 will generally take the form of appropriate program code running on a general purpose processor, the code being responsive to create, modify and remove commands from the graphical application to construct a segment tree 20. More particularly, the segment organizer 13 may be implemented in an object-oriented idiom with class objects being provided to create segment, boundary, fill and transform instance objects as required. In this case, where, for example, the graphical application 10 wishes to create a new segment and add it to an existing tree structure, it does so by first messaging the class objects for transform, fill and boundary in order to create appropriate instances of transform, fill and boundary (assuming that appropriate instances do not already exist). In messaging the class objects to create the appropriate transform, fill and boundary instances, the application 10 will provide the necessary dam. Next, the application 10 messages the segment class object requesting it to create a new segment instance utilizing the newly created boundary, fill and transform instances and having associations with other segments as specified by the application 10. In creating a new segment, it may, for example, be necessary to specify the segment as having a sibling priority higher than existing siblings. This will, of course, require pointer adjustments in the existing parent and sibling segments. Such adjustment will be handled by the segment instant objects themselves by appropriate messaging between the objects. Implementational details of such an object-oriented version of the segment organizer 13 will be apparent to persons skilled in the art and will therefore not be described further herein.

It may be noted that at the time the segment tree 20 is being constructed by the organizer 13 in response to commands on the graphical application 10, certain data items may be calculated to facilitate subsequent operation of the converter 14. In particular the Concatenation Transformation Matrix and background segment of each segment may be determined and cached for use by the converter 14. However, in the present embodiment these items are determined by the converter 14 itself.

Conversion to Span Table

The converter 14 effects a conversion process by which the segments of the segment tree 20 are converted into a set of image lines each represented by a span list containing one or more spans, the span lists being stored in the span table 60. In this conversion process, segments are correctly positioned in the final image, any overlap conflicts are resolved, and the segments are scaled from internal, point-unit co-ordinates to device co-ordinates. The device coordinates are generally specified in terms of pixels in an X,Y co-ordinate frame of reference. The image lines represented by the span lists extend in the Y co-ordinate direction of the device frame of reference (this is because the buffer 17 will generally be organized such that pixels on the same image line are adjacent in the buffer thereby increasing efficiency of access); it will be appreciated that in appropriate circumstances, the span lists could be arranged to extend in the X co-ordinate direction.

Figure 6:
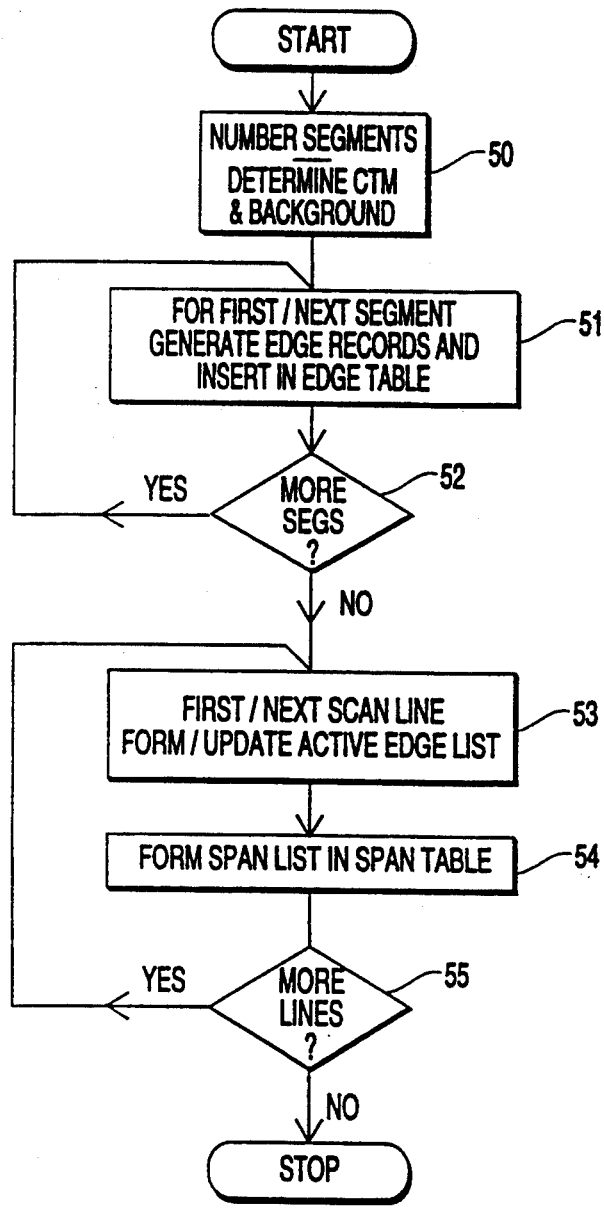
FIG. 6 is a flow chart illustrating the general progression of the conversion process effected by the FIG. 1 renderer in forming the scan table from the segment tree.

The general progression of the conversion process is illustrated in FIG. 6. The first step of the conversion process is for the segments to be numbered in the order that they are to be processed (step 50). Thereafter, the CTM and background segment are determined (in fact, this determination can conveniently be done during segment numbering and so has been shown as part of step 50). Next, an edge table is formed containing edge records on all the defining edges of all the segments (step 51 and 52). Finally, the span table is built up a line at a time by examining the edge records of the edges that intersect with the current image line of interest (steps 53–55).

Considering first the segment processing order number (step 50), the general purpose here is to ensure that segments are processed in their depth priority order so that overlap conflicts are simply resolved by not allowing subsequently processed segments to overwrite previously processed ones. However, because contained children and their descendants are clipped to the boundary of their containing ancestors, it is necessary for a background segment to be processed before its contained children (and their descendants) even though the latter overwrite the former, since otherwise the clipping boundary would not be known in image coordinate terms at the time the contained children were being processed. This requirement leads to the basic writing rule that later processed segments cannot overwrite earlier processed ones being modified by the proviso that a segment may overwrite its background segment.

In numbering the segments the tree is traversed from the root segment. For each to segment the following rule is then applied regarding the precedence of numbering of associated segments:

above children (and all their descendants) of the segment under consideration are numbered first;

thereafter the segment under consideration is numbered;

next, the contained segments (and their descendants) of the segment under consideration are numbered;

finally, the below segments (and their descendants) of the segment under consideration are numbered.

With regard to siblings, these are handled starting at the head of the list so that the sibling segment at the head of the list and all of its descendants will be numbered before the second sibling (and all its descendants) are numbered and so on for other siblings in the same sibling list. The traversal numbering algorithm may be more formally represented by the following pseudo code:

PROCNUM Recursive routine for allocating processing order number.

"This_Seg"=current parent segment—local
"S"=child of interest—local
"Number"=processing order number—global 1. Starting with S set to first above child of This_Seg, repeat the following until no more above children of This_Seg, with S being set to the next above child before each repeat:

Do routine PROCNUM for segment S as the current parent segment.

2. Increment Number.

3. Allocate Number as the processing order number of This_Seg.

4. Starting with S set to first contained child of This_Seg, repeat the following until no more contained children of This_Seg, with S being set to the next contained child before each repeat:

Do routine PROCNUM for segment S as the current parent segment.

5. Starting with S set to first below child of This-Seg, repeat the following until no more below children of This_Seg, with S being set to the next below child before each repeat:

Do routine PROCNUM for segment S as the current parent segment.

Using the allotted processing order number, the output image can be drawn up from the segment tree according to the above-described writing rule that a later processed segment cannot overwrite an earlier processed one except where the earlier segment is the background segment of the later processed segment.

The foregoing writing rule for convening a segment tree to an image applies regardless of the process details involved in this conversion. In other words, it applies not only for the processing effected by the converter 14 but also for physically drawing up an image by hand from a segment tree. This will be readily appreciated if the reader reproduces FIG. 5 working from the segment tree of FIG. 4 utilizing the processing order numbering that has already been annotated to the segments (this numbering having been determined in accordance with the above numbering algorithm).

After the segments have been numbered (or, as already indicated, concurrently with this numbering), the CTM and background of each segment are determined. Each determination can be readily achieved using a stack (a Last In First Out or LIFO data structure).

Thus, with regard to CTM determination, the RTM of the root segment (which is also its CTM) is first put in a CTM stack and the segment tree is then traversed. Each time a segment is first encountered by being reached by descending down a parent-child relationship or across a sibling relationship, its CTM is determined by combining its RTM with the CTM on top of the CTM stack. The newly-determined CTM is then cached with the segment dam, and, in addition, placed on top of the stack. Whenever a segment is exited by ascending a parent-child relationship or by crossing a sibling relationship, then its CTM is removed from the top of the CTM stack.

Background-segment determination is effected in a similar manner with a background stack being initialised to empty before traversal of the segment tree is begun. Each time a parent-child containment relationship is descended, the identity of the parent is entered into the background stack whilst each time a containment relationship is ascended, the top stack entry is removed. The top entry in the background stack identifies the background segment for the segment currently reached during traversal of the tree; the identity of a segment's background is cached with the segment data.

After the segments have been numbered and their CTMs and backgrounds determined, the edge table 61 is created and filled (steps 51, and 52). The edge table is a data structure that contains an entry for each Y-coordinate line of the output image. The entry for each line is a list of all segment edges that, in device coordinate terms, have their starting Y co-ordinate on that line, this list being formed by a linked list of edge records 63 with the first edge record in the list being pointed to by a pointer held in the edge table data structure 61. Where there are no edges having a starting Y coordinate corresponding to a particular Y-coordinate line, the corresponding entry in the edge table is set to null.

Each edge record 63 contains data describing the corresponding segment edge in device co-ordinate terms together with the identity of the segment from which the edge originates and preferably the processing order number and background of that segment (though these latter items can always be obtained when required by referring to the segment itself).

The edge table is populated by processing each segment in turn according to the processing order number. In fact, where the whole output image is to be rendered, the order in which the segments are processed to form the edge table does not matter. To process a segment, each edge of the or each outline making up the segment boundary is transformed into its output image form by application of the CTM of the segment and data characterising the resultant edge is stored in a corresponding edge record 63. This record is then inserted into the edge table 61 where appropriate.

Figure 7:
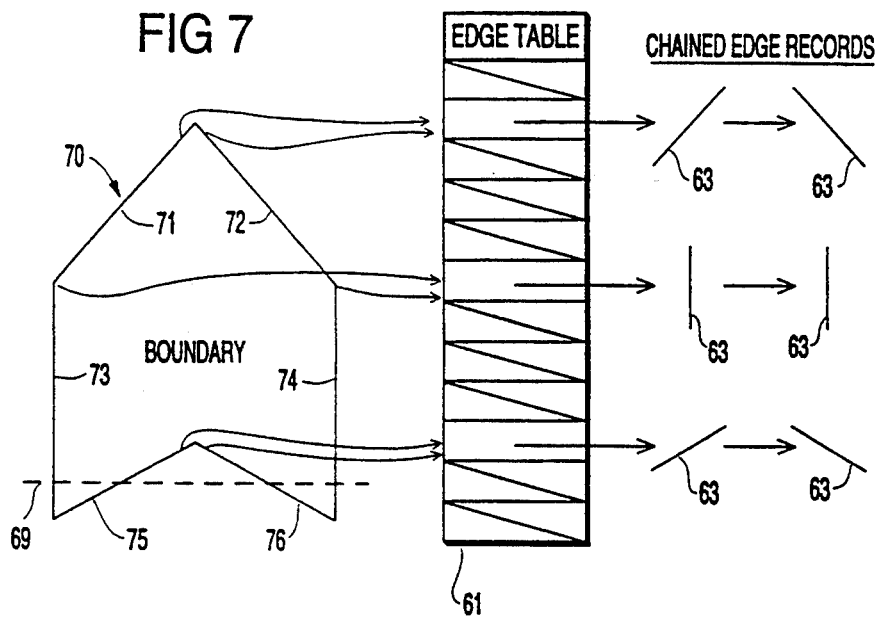
FIG. 7 is a diagram illustrating a step of the FIG. 6 conversion process in which an edge table is formed containing edge records for all the graphic segments.

FIG. 7 illustrates the processing of one segment to enter its edges into the edge table 61. As can be seen, the boundary 70 of the segment is composed of six edges 71 to 76. Edges 71 and 72 have the same starting Y coordinate and are accordingly entered as edge records 63 into the same edge list of the edge table 61. Similarly edges 73 and 74 have the same starting Y coordinates causing their edge records to be entered in the same edge list. Again, edges 75 and 76 also have the same starting Y coordinate and have their edge records 63 entered in the same edge list of the edge table 61.

Once all the edges have been entered into the edge table 61, the conversion process moves onto its next phase in which for each scan line (y-coordinate line of the output image) an active edge list 62 is formed listing all the edges intercepting the scan line (step 53), the active edge list is then used to form a corresponding span list in the span table 60 (step 54). The active edge list 62 is formed for the first scan line by entering into the active edge list all edge records 63 starting at the first line. For subsequent scan lines, the active edge list 62 is formed by updating the active edge list for the preceding scan line. This updating process involves both adding in edge records for edges that start at the current scan line, and updating the edge records already included in the active edge list. This updating involves updating the current X and Y coordinate values for the edge by changing the X coordinate according to the gradient of the edge and incrementing the Y value. In the event that this updating indicates that the edge no longer intercepts the scan line, then the edge record 63 is removed from the active edge list 62.

Figure 8:
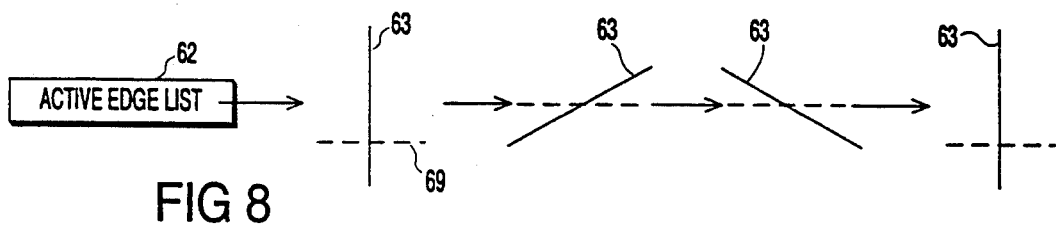
FIG. 8 is a diagram illustrating the nature of an active edge list formed during the course of the FIG. 6 conversion process.
Figure 9:
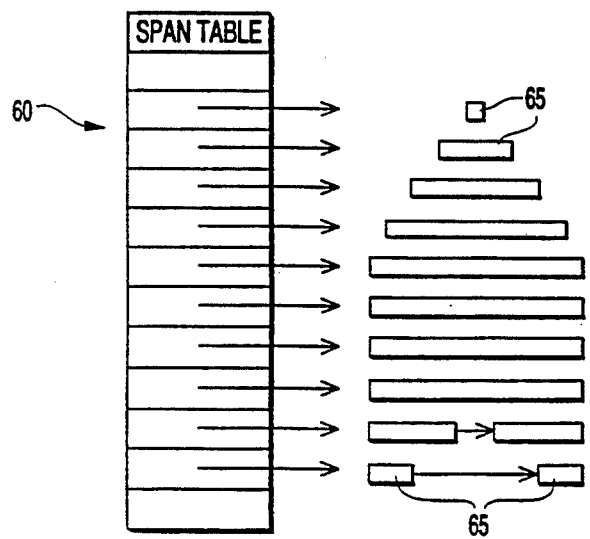
FIG. 9 is a diagram illustrating the nature of the span table produced by the FIG. 6 conversion process.

FIG. 8 shows the edge records 63 constituting the active edge list 62 for the scan line 69 shown dashed in FIG. 7. The interception of the current scan line with the edges represented by the edge records are shown in FIG. 8.

After the active edge list for a scan line has been formed, the constituent edge records are sorted according to their associated segment processing order number, and on the current X interception point of the scan line and the edge.

Figure 10:
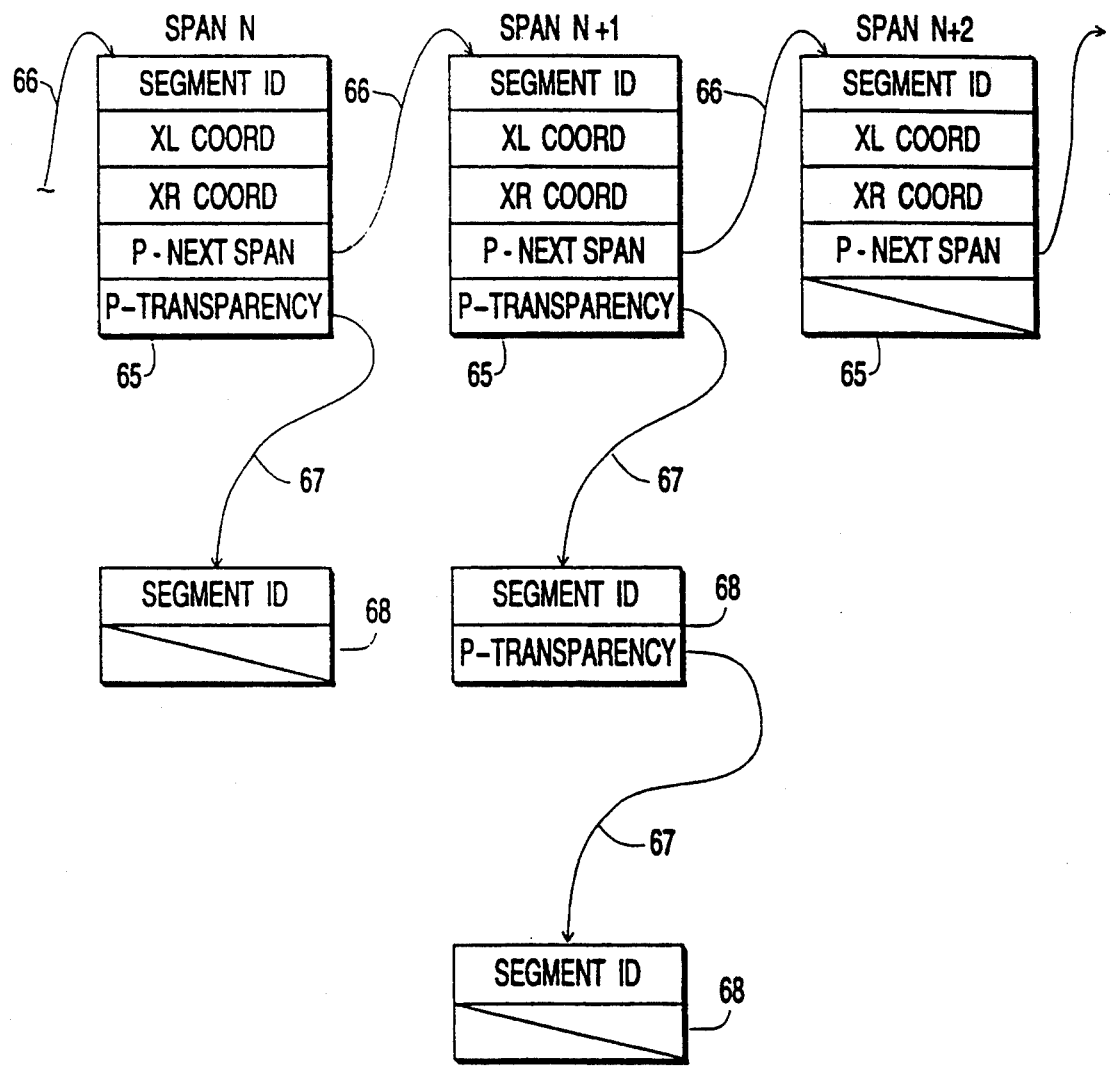
FIG. 10 is a diagram illustrating three inter-linked span data structures with two of these spans having associated transparency lists.

Using the sorted active edge list 62, the span table entry corresponding to the current scan line is created. This span table entry comprises a span list holding one or more spans 65 as a linked list. A span defines an uninterrupted section of an output-image scan line associated with a particular segment. FIG. 10 illustrates a portion of a scan list comprising three spans 65 identified as spans N, (N+1) and (N+2). Each span has five fields one of which identifies the relevant segment whilst two locate the span in terms of its left and right X-coordinates (XL and XR respectively); a Y coordinate field is not essential because the span table data structure implies the Y-coordinate for the spans of each constituent span list, by the position of a span list in the span table. The remaining two fields of the span data structures are pointers, namely a pointer 66 (P-NextSpan) that points to the next span (if any) in the current span list, and a pointer 67 (P-Transparency) that points to the first record 68 of a transparency list the purpose of which will be described later in the text.

To form the span list, the active edge list is processed by taking successive pairs of edge records in the list and using each pair to form a corresponding span with its two delimiting X-coordinate values set to the current X values of the edge records concerned, the Y-coordinate value set to that of the current scan line, and its segment identity set to that of the two edge records concerned (these records will have the same segment identity because the active edge list has been sorted according to processing order number and there are always an even number of edges to a segment when considered at any Y-coordinate value).

Once a span has been formed, an attempt is then made to insert it into the span list for the current scan line. However, this insertion is subject to the above-mentioned rule for writing segments in the final image when processed according to their processing order number—namely that a segment (or, in this case, a span of a segment) can only be written if it does not overwrite another segment (or segment span), except where the segment to be overwritten is the background segment for the current segment. The identity of the segment constituting the background that can be overwritten by the current span is obtainable either from the edge records delimiting the span or by reference to the segment from which the span is derived.

The insertion process involves adjusting the delimiting X-coordinate values of the span being merged, and of any partially overwritten spans, as appropriate (including splitting affected spans into two or more spans where required), and setting the P-Nextspan pointers of affected spans accordingly.

FIG. 11 is an example showing in ten stages the construction of a span list 81 for the scan line taken on line 80—80 in FIG. 5. For each stage (i) to (x) illustrated in FIG. 11, both the current contents of the span list 81 and the span 82 to be merged into the span list, are shown, the span 82 being shown below the existing span list 81.

Within each span 82 to be merged into the span list, not only has the identity of the corresponding segment been shown, but also the (processing number, background segment) pair in order to facilitate an appreciation both of the order in which segment spans are processed and whether overwriting of the span into the existing span list will be successful.

In stage (i) the span list is shown as already holding a span corresponding to the root segment "a". The span 82 to be merged is a span from segment "b", this being the next segment to be processed according to the processing order number of the segments that intersect the scan line 80—80. The background segment for segment "b" is the root segment "a"; as a result, the span 82 for segment "b" can be fully merged into the span list. The resultant span list 81 is shown in stage (ii) of FIG. 10 and, as can be seen, the span list now comprises three spans linked together since the span originally corresponding to the root segment "a" has been split into two spans by the segment "b" span.

In stage (ii), a span 82 corresponding to segment "e" is merged into the span list 81. Since the background for segment "e" is segment "b" and since the span 82 lies wholly within the bounds of the segment "e" span in the span list 81, the whole of the segment "e" span 82 is successfully merged into the span list to produce a new span list 81 shown in stage (iii).

In stage (iii), a span 82 from segment "f" is to be merged into the span list 81, the background segment for segment "f" being segment "b". Since the segment "f" span 82 overlaps spans corresponding to segments "e" and "b" in the span list 81, only part of the span 82 will be merged into the span list 82, this part being the part overlapping the background segment "b" of segment "f". The resultant partial merge of segment "f" span 82 into the span list is shown by the new span list 81 in stage (iv).

The merging of the spans 82 into the span list 81 effected in stages (iv) to (x) proceeds in substantially the same manner as for stages (i) to (iii) and will therefore not be described in detail. At the end of the conversion process, the segment tree 20 has been converted into a span table representation of the image in which all segments have been mapped into the final output image in their correct location, orientation and size and all overlap conflicts have been resolved. The span table 60 provides a compressed representation of the final output image in device coordinate terms.

As with the segment organizer 13, the converter 15 is preferably implemented in code running on a general purpose processor, this implementation being, for example, in an object-oriented idiom with objects corresponding to the edge table, the edge list, the edge records, the active edge list, the span table, the span lists and the spans.

Output Process

As already indicated, the span output function 15 of FIG. 1 has a single operational primitive Drawspan that commands the output device 12 to draw a line of given colour at a given Y coordinate position and between two X coordinate positions. The output process involves calling Drawspan for each of the spans in the final span table 60. Because the spans of the span table do not overlap, and are each fully defined in their own right, the order in which the spans are output to the device 12 using Drawspan is not critical. For maximum transfer efficiency, spans of the same colour can be output together so that it becomes only necessary to specify colour when this colour is to be changed (it will, of course, be appreciated that this can only be done with certain types of output device where random writing of the image is possible).

The colour associated with each span in the span table is obtained by referring to the fill of the corresponding segment. Where this fill is a polychromatic bit map, then the Drawspan must be called for each monochromatic component sub-span.

Upon initialisation of the system, the output process may initialize a colour look-up table in cooperation with the output device. At the same time, parameters such as extra-image background colour and image size may be specified. As already indicated, image size is reflected in the size of the root segment and of the scaling factors in the root segment's RTM.

The output device 12 will generally construct one or more scan lines in the buffer 17 before the scan lines are output to the real world in the form of a display on a visual display unit. Where the buffer 17 does not hold a full image bit map, then the order in which the spans are output using Drawspan becomes important since the output device will require certain scan lines to be output before others.

Image Updating and Cursor Handling

In the foregoing, the FIG. 1 embodiment has been described in terms of a complete segment tree being constructed by the application 10 and then output by the renderer 11 to the output device 12. It will be appreciated that the segment tree rather than having to be recreated each time there is a change in the image to be represented, can be modified as required by use of the cream, modify and delete commands by the application 10. Once modification of the segment tree is complete, then it can be converted into a new output image. This conversion may be repeated from the beginning each time a new image is to be created; alternatively a limited conversion process may be effected as is known in the art where, for example, reconversion is limited to a rectangular bounding box delimiting the updated area of the image.

With regard to display cursors and other fast moving sprites used in display applications of the graphic output system, as already noted such cursors can conveniently take the form of segments in an above-attachment relationship to the root segment of the segment tree 20. Furthermore, the cursor (or cursors) and any descendants are preferably treated as a sub-tree separate from the main sub-tree that is associated with the root segment through a containment relationship. The cursor sub-tree is then separately numbered and rendered by the converter 14 to create a separate cursor span table 60C (see FIG. 1) additional to the main output image span table 60. These two span tables are finally combined by the span output function 15 with the cursor span table 60C taking precedence over the main image span table 60. This arrangement has the advantage that the main span table does not need to be recreated each me a cursor (and its descendants) is moved but simply acts as a background for the cursor; recreation of the cursor span table is a relatively simple matter as this table is limited to the boundary of the cursor itself (together with any descendant segments).

Movement of a cursor by modifying its RTM may be effected by the application as a consequence of some application processing decision or in response to user input via a pointing device. However, because cursor movement in response to user input via a pointing device is by far the most common form of cursor manipulation, special measures are preferably taken to maximize the efficiency of such cursor movement. More particularly, the cursor span table has associated X and Y offsets that specify, in image coordinate terms, X and Y offsets by which the spans in the cursor span table must be shifted by the span output process before being combined with the main span table. It then becomes a relatively simple matter to update the cursor's position in response to user input through a pointing device since all that is now required is for the new absolute X and Y image coordinate values pointed to by the device, to be stored and used as the aforesaid X and Y offsets. For consistency of cursor movement as effected by the application and directly from the pointing device, for any cursor displacement that the application wishes to effect the Tx and Ty translations in the cursor segments CTM are converted by the convertor 14 into X and Y offset values for the cursor span table and are not used to position the cursor spans within the cursor span table itself.

Where several cursors exist concurrently as siblings in an above-sibling chain associated with the root segment, each cursor (with its descendants) could be treated as a separate sub-tree having its own associated span table, in which case the span output function would be operative to combine each such span table in priority order with the main span table 60. However, it is generally adequate to utilise a single cursor sub-tree and span table 60C even where multiple cursors exist.

User Input

As is indicated in FIG. 1, user input to the application 10 is effected by input devices 101, these devices being interfaced with the application 10 by an input event handler 100. Of primary interest in the present context is input effected by reference to the image displayed on the graphical output device 12. Such input may be generated by a mouse or other pointing device and will generally include an image position in image X, Y coordinate terms. For present purposes, it is assumed that this image position is an absolute one even where the pointing device is intended to detect relative movement, the necessary processing to provide an absolute position output being encompassed within the function block 101.

Figure 12:
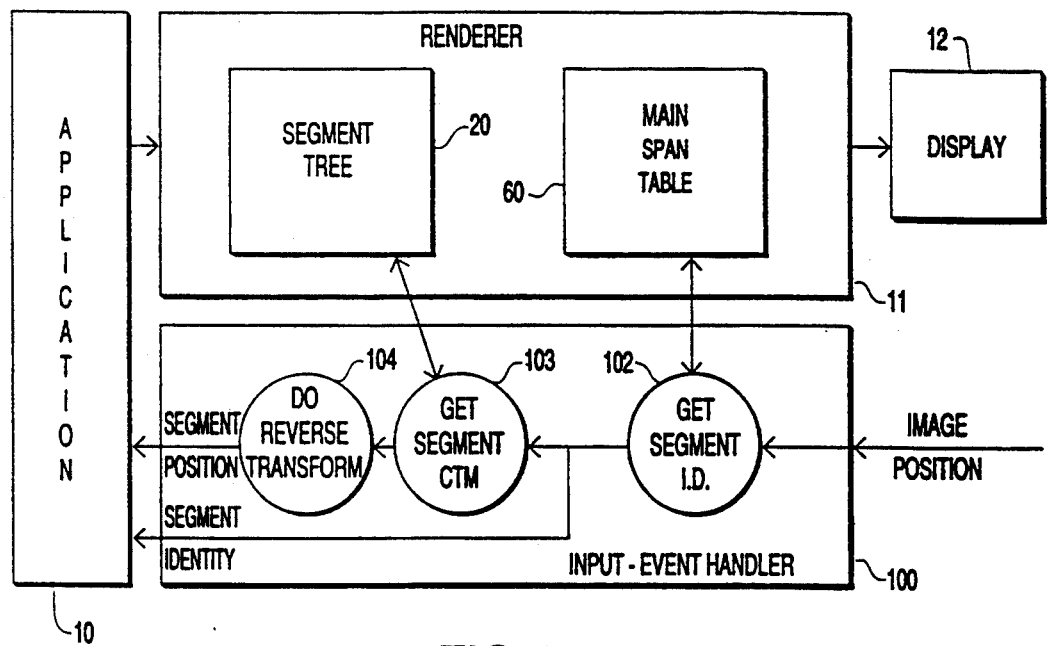
FIG. 12 is a diagram illustrating the general operation of an input-event handler of the FIG. 1 graphics system when converting an image position into segment terms.

FIG. 12 illustrates the general process by which an image position in image coordinate values is converted by the input-event handler 100 into meaningful information for passing on to the application 10. More particularly, the image position is translated into the identity of the segment displayed in that image position and the position pointed to within that segment in segment coordinate terms (that is, point-units as applied to a standard reference point relative to the segment-for example the minimum X and Y coordinate values). The segment corresponding to the input image position will generally be referred to hereinafter as the "target" segment and the position indicated within that segment as the "targeted" position.

The process for deriving target segment identity and targeted position from an input image position comprises three tasks 102, 103 and 104. The first of these tasks is to identify the target segment from the image position and this is done by referring to the main span table 60 with the input X and Y image position coordinates are used to identify the appropriate span list and then the appropriate span within that list; this span then directly identifies the corresponding segment and this segment is the target segment.

Once the target segment has been identified, task 103 then references the segment tree 20 in order to ascertain the Concatenation Transform Matrix (CTM) for that segment. As previously described, this matrix was generated in step 50 of the conversion process carded out by the converter 14 when creating the output image, the matrix being cached with the segment concerned. If, for example, for reasons of memory limitations the cached CTM has been destroyed, then it is recalculated by concatenating the relative transform matrices RTM of the target segment and all of its ancestors in the segment tree 20. It will be appreciated that where the segment organizer 13 has been implemented in object oriented form, the process of deriving the CTM if not directly available, is taken care of by the target segment object by appropriate messaging of its ancestor segments.

After task 103 has ascertained the CTM of the target segment, task 104 generates the inverse matrix and effects a reverse transformation of image coordinate position to segment coordinates as applied to the target segment. The resultant targeted position is then output with the target segment identity to the application 10.

Figure 13:
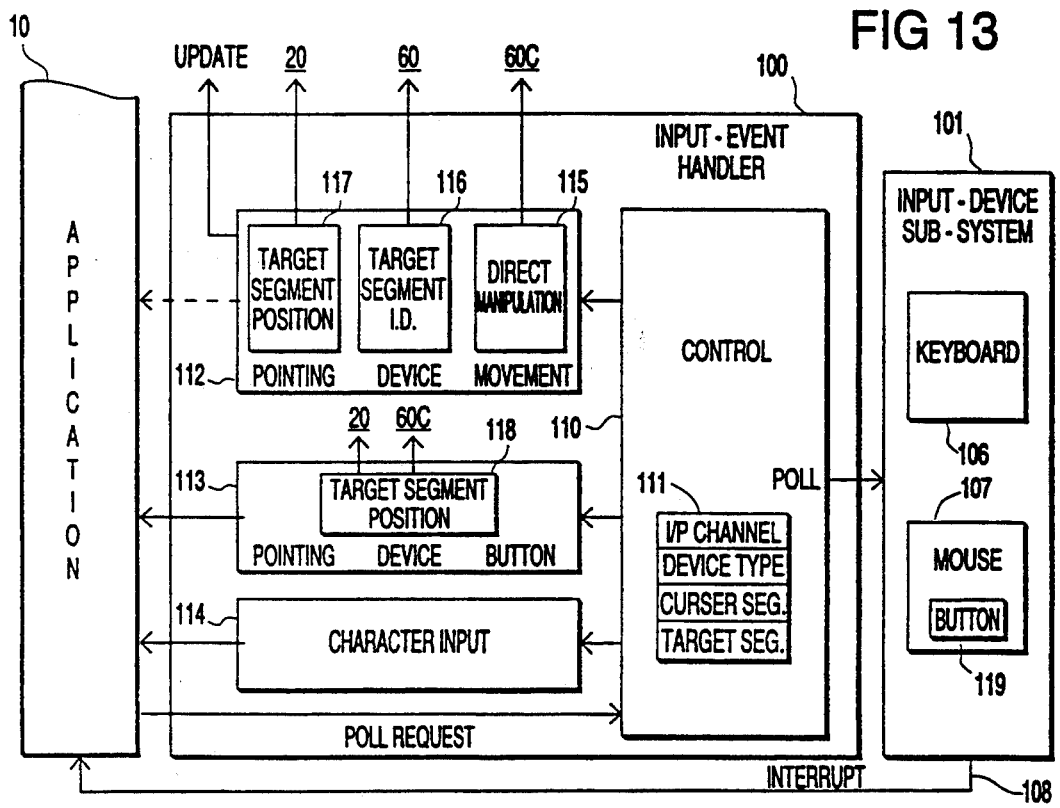
FIG. 13 is a functional block diagram of the FIG. 1 input-event handler.

FIG. 13 is a functional block diagram of the input-event handler 100. In FIG. 13 the input-device sub-system 101 is shown as comprising a keyboard 106 and a pointing device in the form of a mouse 107 with a button 119; the sub-system 101 may comprise other input devices including further pointing devices. The input-device sub-system 101 is so arranged that whenever any of the input devices has a new event to pass to the input-event handler 100, an interrupt 108 is generated and fed to the application 10 in order to cause the latter to initiate polling of the sub-system 101 by the input-event handler 100.

The input-event handler 100 includes a control functional block 110, a pointing-device movement-event processing function 112, a pointing-device button-event processing function 113 and a character input-event function 114. The control function 110 includes a respective data structure 111 for associating particular characteristics with each input channel where an input channel corresponds to a respective one of the input devices of the input-device sub-system 101. More particularly, the data structure 111 includes an input-channel identification field, a device type field identifying the type of input device associated with the channel (for example, keyboard or pointing device), and where the device type is a pointing device, a field identifying the graphic segment forming the image cursor associated with the pointing device. Where the input device is a pointing device, its data structure 111 may also include a field identifying the current target segment pointed to by the pointing device; this latter field need not be stored in the data structure 111 but could be stored with the corresponding cursor segment. A respective data structure for each input channel is initialised when the graphics systems is first started up.

Upon the input-device sub-system 101 generating an interrupt 108, the application 10 responds by passing a poll request to the control function 110 of the input-event handler 100. Thereafter, the control function 110 polls each of the input devices 106, 107 in turn. For the or each input-event detected by this polling process, the control function 110 causes an appropriate one of the functions 112, 113 and 114 to process the input event depending on whether this event is a movement of the pointing device 107, operation of a pointing device button or a character input through the keyboard 106. After each function has completed its operation, control is returned to the control function 110 to continue its polling of the input devices. When all input devices have been polled and all input-events processed by the appropriate function 112, 113, 114, the control function 110 terminates the polling operation and signals the application 10 accordingly. During the polling process the application 10 is generally arranged not be modify the segment tree 20 (though in appropriate circumstances, certain modifications may be permitted).

The event-processing functions 112, 113 and 114 will now be described in more detail. Considering first the pointing-device movement-event processing function 112, whenever the control function 110 detects a movement event, it passes to the function 112 the identity of the device concerned (as its input channel number) together with the new image coordinates pointed to by the device. The first task carried out by the movement event function 112 is to directly update the output image to reflect the new position of the cursor associated with the input device concerned (see block 115). This cursor position updating is effected by passing the new X and Y image coordinate values to the cursor span table 60c associated with the input device—this span table is identified by referring to the corresponding data structure 111 to ascertain the cursor segment associated with the input device and the association between cursor segment and span table is effected by the renderer 11 itself. The new X and Y image coordinate values passed to the appropriate cursor span table are then used as the X and Y offset values for that span table when the latter is combined by the output process 15 with the main span list 60.

The next task carried out by the movement event processing function 112 is to identify the target segment pointed to by the pointing device (block 116). This identification is effected by using the new X and Y image coordinate values to reference the main span table 60 in the manner described above with reference to FIG. 12. If the identified target segment differs from that previously pointed to by the pointing device as indicated by the target segment identity stored in the data structure 111 for that device, then the movement-event processing function 112 is arranged to notify the application 10 of the new target segment and the targeted position within that segment. This latter parameter is determined by task 117 by referencing the segment tree 20 to ascertain its CTM whereby to effect the reverse transformation of image position to segment position. Execution of task 117 may be limited to when there is a change in target segment; alternatively, task 117 can be executed every time a movement event is processed with the targeted position being stored along with the target segment so as to be available immediately should the application 10 request this information.

After the movement-event processing function 112 has completed processing of a movement event, it checks with the input-device sub-system to ascertain if any other movement events are awaiting processing; if this is the case, these events are processed in turn. When all movement events have been processed, the movement-event processing function 112 makes an "update" call to renderer 11 to cause the latter to update the output image to reflect the new position of the pointing device cursor concerned. As already indicated this updating simply involves merging the cursor span table at its new offset position into the main span table and this is effected by the span output process 15 as it outputs spans to the output device 12.

The pointing-device button-event processing function 113 is called by the control function 110 whenever the latter detects a change of state of a pointing device button. In calling the function 113, the control function 10 passes it the identity of the pointing device concerned, the identity of the pointing device button involved and the new status of that button. The button-event processing function 113 passes on this information to the application 110 together with the identity of the current target segment and the targeted position within that segment since this information will generally be required by the application 10 when processing the button-event. The identity of the current target segment for the pointing device concerned is readily ascertained as this information is stored in the data structure 111. The current targeted position in image coordinate terms can also be readily obtained as this information is stored in association with the corresponding cursor span table (it being the X and Y offset values for that span table). A task 118 of the button-event processing function 113 retrieves the targeted image position and then uses this information together with the target-segment CTM as obtained from the segment tree 20, to determine the targeted segment position. This information is then passed to the application 10.

Finally where the input-event detected by the control function 110 when polling the input-device sub-system 101, is a character-event emanating from the keyboard device 106, the control function 110 calls the character-event processing function 114 to pass the appropriate character information on to the application 10.

Transparent Segments

As already mentioned, a segment may be flagged as transparent by setting of a flag in its field 32. A transparent segment is like any other segment except that it cannot obscure any other segment in the final output image; a transparent segment is thus clipped to its background segment and will similarly clip any contained descendants. A portion of the output image displayed as a particular opaque segment may be covered by one or more transparent segments. The purpose of the transparent segments is to facilitate input event detection in interactive applications, particularly where overlapping detection zones are required; additionally or alternatively, they can be used to group segments in the tree.

Although transparent segments are not directly visible in the output image, it is necessary to subject them to the same sort of conversion process as normal segments in order to determine how they are clipped and overwritten by other segments. In the present embodiment this is achieved by leaving the main link list of spans in a span list unaltered by the presence of transparent segments but arranging for each of the main spans to point to a link list of transparent segments that overlap the span. Thus, with reference to FIG. 10, the final field P-Transparency of a span 65 holds a pointer 67 which points to the first record of a list of records 68 listing the transparent segments that lie above the span. Each transparent segment record comprises a segment ID field, and pointer to the next record in the transparent segment list (if any). When a transparent-segment span is being added to the span list, it generally obeys the basic writing rule that it can only overwrite its background segment but with the modification that it can also overlie other transparent segments (without prejudice to it being clipped by its background where the latter is also a transparent segment). It may well be necessary to split a transparent-segment span into one or more transparency records 68 if the transparent-segment span extends across more than one main span 65. Furthermore, if a transparent span does not overlap an existing span completely, the existing span is split into smaller spans so that the transparent span will have the same XL and XR co-ordinates as the opaque span it overlies.

When an input event requires either the movement-event processing function 112 or the button-event processing function 113 to determine the identity of the segment pointed to by a pointing device, examination of the relevant span table span not only involves extracting the segment identity from the segment ID field of the span record 65, but also a check on the status on the P-Transparency field. If this field points to a list of one or more transparency records 68, then these records are also examined and the identity of the or each transparent segment pointed to by the pointing device is passed back to the relevant event processing function 112/113 together with the identity of the main-span target segment. Each such transparent target segment is then processed in the same manner as the main target segment. Thus, the application may, for example, be notified that a particular pointing-device is pointing to a particular main target segment and several transparent target segments which may result in the application 10 carrying out a particular function associated with each target segment notified to it.

In an alternative embodiment, the application 10 is notified of only the topmost transparent segment, or if there are no transparent segments, of the opaque segment identity. The application 10 can then ask for the identity of all the segments below a reported transparent segment if it needs that information.

Variants

It will be appreciated that the above-described graphics system can be subject to many variations without departing from the concept of the present invention as set out in the accompanying claims. Thus, with regard to the segment organizer and the segment tree 20, the segments 21 can be organized in a hierarchical structure other than the described acyclic tree and, indeed, need not necessarily be organized hierarchically at all.

Furthermore, a reference to the CTM data for converting a segment from the internal coordinate system to the device (image) coordinate system can be stored with each span of the span table so as to avoid the need to refer back to the segment tree. The organization of the transformation data may, of course, differ from that described.

The span table 60 could be replaced by an alternative form of image representation linking image position to segment identity. Thus, for example, this image representation could be a two-dimensional array giving segment identity for each (X,Y) co-ordinate pair. Clearly, such a representation is less compact than the span table and accordingly occupies more storage space (as well as potentially giving rise to slower processing).

I claim:

1. A graphics system including:

segment storage means for storing a plurality of graphic segments to be used for display, potentially in overlapping relation, in a two-dimensional output image, said graphic segments having associated spatial transformation data for transforming the segments from segment coordinates into image coordinates;

converter means for deriving from the stored graphic segments, output signals representative of said two-dimensional image with all overlap conflicts between segments resolved, the converter means being operative to locate each segment in said image in dependence on said spatial transformation data and;

input-event processing means for receiving an image position in image coordinate terms and determining a corresponding segment location;

said converter means including storage means and being operative, in generating said output signals, to generate and store in said storage means an image representation relating image position to segment identity, and said input-event processing means including determining means for determination the identity of the segment corresponding to said image position received by the input-event processing means, by reference to said image representation and reverse transformation means for transforming the received image position into segment coordinates by use of said spatial transformation data associated with the segment whose identity has been determined by said determining means.

2. A graphics system including:

segment storage means for storing a plurality of graphic segments to be used for display, potentially in overlapping relation, in a two-dimensional output image, said graphic segments having associated spatial transformation data for transforming the segments from segment coordinates into image coordinates;

converter means for deriving from the stored graphic segments, output signals representative of said two-dimensional image with all overlap conflicts between segments resolved, the converter means being operative to locate each segment in said image in dependence on said spatial transformation data and;

input-event processing means for receiving an image position in image coordinate terms and determining a corresponding segment location, said converter means, in generating said output signals, being operative to generate and store in said storage means an image representation relating image position to segment identity, and said input-event processing means being operative to determine the identity of the segment corresponding to the image position received thereby, by reference to said representation and to map the received image position into segment coordinates by use of said spatial transformation data, said segments being stored in said segment storage means as a hierarchical organisation of graphic segments with each segment having an associated relative spatial transform, said transforms jointly constituting said spatial transformation data; the converter means being operative to locate each child segment in said image in dependence on a concatenation of the relative transforms associated both with that segment and with its ancestors in said organisation; and said input-event processing means in mapping said received image position into segment coordinates, effecting a reverse transformation to that carried out by said converter means for the segment corresponding to said received image position.

3. A graphics system according to claim 2, wherein said concatenation of relative transforms used by said converter means in locating a said child segment in said image, is stored with the corresponding segment, said input-event processing means being operative to access said concatenation when effecting a reverse transformation.

4. A graphics system including:
segment storage means for storing a plurality of graphic segments to be used for display, potentially in overlapping relation, in a two-dimensional output image, said graphic segments having associated spatial transformation data for transforming the segments from segment coordinates into image coordinates;
converter means for deriving from the stored graphic segments, output signals representative of said two-dimensional image with all overlap conflicts between segments resolved, the converter means being operative to locate each segment in said image in dependence on said spatial transformation data and;
input-event processing means for receiving an image position in image coordinate terms and determining a corresponding segment location,
said converter means, in generating said output signals, being operative to generate and store in said storage means an image representation relating image position to segment identity, and said input-event processing means being operative to determine the identity of the segment corresponding to the image position received thereby, by reference to said representation and to map the received image position into segment coordinates by use of said spatial transformation data,
said image representation generated by said converter means taking the form of a set of spans for each of a plurality of lines used to build up the image, each said span representing at least a portion of a respective segment to be displayed in said image and including delimiting coordinate values along the corresponding image line and data indicative of the segment concerned.

5. A graphics system including:
segment storage means for storing a plurality of graphic segments to be used for display, potentially in overlapping relation, in a two-dimensional output image, said graphic segments having associated spatial transformation data for transforming the segments from segment coordinates into image coordinates;
converter means for deriving from the stored graphic segments, output signals representative of said two-dimensional image with all overlap conflicts between segments resolved, the converter means being operative to locate each segment in said image in dependence on said spatial transformation data and;
input-event processing means for receiving an image position in image coordinate terms and determining a corresponding segment location,
said converter meads, in generating said output signals, being operative to generate and store in said storage means an image representation relating image position to segment identity, and said input-event processing means being operative to determine the identity of the segment corresponding to the image position received thereby, by reference to said representation and to map the received image position into segment coordinates by use of said spatial transformation data,
said input-event processing means being operative to receive a succession of image positions in image coordinate terms and to determine for each such image position the identity of the corresponding segment, the input-event processing means including memory means operative to store the identity of at least the most recently determined corresponding segment, and comparing means for comparing the identity of each newly determined corresponding segment with that of its most recent predecessor whereby to detect any change in identity of said corresponding segment, and the input-event processing means being responsive to the detection of such a change to map the current received image position into segment coordinates.

6. A graphics system including:
segment storage means for storing a plurality of graphic segments to be used for display, potentially in overlapping relation, in a two-dimensional output image, said graphic segments having associated spatial transformation data for transforming the segments from segment coordinates into image coordinates;
converter means for deriving from the stored graphic segments, output signals representative of said two-dimensional image with all overlap conflicts between segments resolved, the converter means being operative to locate each segment in said image in dependence on said spatial transformation data and;
input-event processing means for receiving an image position in image coordinate terms and determining a corresponding segment location,
said converter means, in generating said output signals, being operative to generate and store in said storage means an image representation relating image position to segment identity, and said input-event processing means being operative to determine the identity of the segment corresponding to the image position received thereby, by reference to said representation and to map the received image position into segment coordinates by use of said spatial transformation data,
said input-event processing means being operative to receive a succession of image positions in image coordinate terms, said input-event processing means having associated memory means for storing the identity of at least the most recently received image position, and said input-event processing means being responsive to an external trigger event to map the stored most recently received image position into segment coordinates.

7. A graphics system according to claim 6, wherein said succession of image positions are derived from a pointing device and said trigger event is the operation of a control element associated with that device.

8. A graphics system including:

segment storage means for storing a plurality of graphic segments to be used for display, potentially in overlapping relation, in a two-dimensional output image, said graphic segments having associated spatial transformation data for transforming the segments from segment coordinates into image coordinates;

converter means for deriving from the stored graphic segments, output signals representative of said two-dimensional image with all overlap conflicts between segments resolved, the converter means being operative to locate each segment in said image in dependence on said spatial transformation data and;

input-event processing means for receiving an image position in image coordinate terms and determining a corresponding segment location, said converter means, in generating said output signals, being operative to generate and store in said storage means an image representation relating image position to segment identity, and said input-event processing means being operative to determine the identity of the segment corresponding to the image position received thereby, by reference to said representation and to map the received image position into segment coordinates by use of said spatial transformation data, said plurality of graphic segments including a cursor segment for indicating the received image position in said output image, said converter means being operative to generate and store an image representation of said cursor segment that is distinct from the first mentioned image representation, the converter means being operative to combine said image representations in generating said output signals with the cursor image representation taking precedence over said first mentioned image representation.

9. A graphics system according to claim 8, wherein the cursor image representation includes associated offsets that serve to determine the placement of the cursor image representation within the said first mentioned image representation when the two representations are combined, said input-event processing means being operative to update said offsets in response to the receipt of image positions relating to said cursor segment.

10. A graphics system according to claim 8, wherein segments stored in said segment storage means may be selectively associated with said cursor segment, the converter means being operative to generate said image representations with the segments associated with the cursor segment being rendered in said cursor image representation.

11. A graphics system including:

segment storage means for storing a plurality of graphic segments to be used for display, potentially in overlapping relation, in a two-dimensional output image, said graphic segments having associated spatial transformation data for transforming the segments from segment coordinates into image coordinates;

converter means for deriving from the stored graphic segments, output signals representative of said two-dimensional image with all overlap conflicts between segments resolved, the converter means being operative to locate each segment in said image in dependence on said spatial transformation data and;

input-event processing means for receiving an image position in image coordinate terms and determining a corresponding segment location, said converter means, in generating said output signals, being operative to generate and store in said storage means an image representation relating image position to segment identity, and said input-event processing means being operative to determine the identity of the segment corresponding to the image position received thereby, by reference to said representation and to map the received image position into segment coordinates by use of said spatial transformation data, said input-event processing means being operative to receive and independently process image position information from a plurality of different input devices.

12. A graphics system including:

segment storage means for storing a plurality of graphic segments to be used for display, potentially in overlapping relation, in a two-dimensional output image, said graphic segments having associated spatial transformation data for transforming the segments from segment coordinates into image coordinates;

converter means for deriving from the stored graphic segments, output signals representative of said two-dimensional image with all overlap conflicts between segments resolved, the converter means being operative to locate each segment in said image in dependence on said spatial transformation data and;

input-event processing means for receiving an image position in image coordinate terms and determining a corresponding segment location, said converter means, in generating said output signals, being operative to generate and store in said storage means an image representation relating image position to segment identity, and said input-event processing means being operative to determine the identity of the segment corresponding to the image position received thereby, by reference to said representation and to map the received image position into segment coordinates by use of said spatial transformation data, said plurality of segments including transparent segments not intended to be viewable in the output image, said converter means being operative to incorporate the transparent segments in said image representation where they would appear if not transparent but without removing segment portions they overlap, the converter means being further operative to disregard said transparent segments when generating said output signals, and the input-event processing means in determining the identity of the segment corresponding to said received image position, being operative also to identify any transparent segments at the same image position.

* * * * *

UNITED STATES PATENT AND TRADEMARK OFFICE
CERTIFICATE OF CORRECTION

PATENT NO. : 5,448,688
DATED : September 5, 1995
INVENTOR(S) : Peter HEMINGWAY

It is certified that error appears in the above-indentified patent and that said Letters Patent is hereby corrected as shown below:

Column 1, lines 58-59, change "convened" to --converted--;

Column 10, line 49, change "dam" to --data--;

Column 11, line 55, delete "to";

Column 12, line 62, change "dam" to --data--;

Column 16, line 38, change "cream" to --create--;

Column 18, line 11, change "carded" to --carried--;

Column 24, line 1, change "meads" to --means--.

Signed and Sealed this

Ninth Day of July, 1996

Attest:

BRUCE LEHMAN

Attesting Officer

Commissioner of Patents and Trademarks